US012619544B2

(12) United States Patent
Maiorano et al.

(10) Patent No.: US 12,619,544 B2
(45) Date of Patent: May 5, 2026

(54) DIFFERENTIAL APPROACH FOR INDIRECT MEMORY PREFETCHER TRAINING

(71) Applicant: QUALCOMM Incorporated, San Diego, CA (US)

(72) Inventors: Damian Maiorano, San Jose, CA (US); Tanvir Manhotra, Austin, TX (US); Sabine Francis, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/802,727

(22) Filed: Aug. 13, 2024

(65) Prior Publication Data

US 2026/0050555 A1 Feb. 19, 2026

(51) Int. Cl.
*G06F 12/08* (2016.01)
*G06F 12/0862* (2016.01)

(52) U.S. Cl.
CPC ................................ *G06F 12/0862* (2013.01)

(58) Field of Classification Search
CPC ......... G06F 12/0862; G06F 2212/6024; G06F 2212/6026; G06F 2212/602; G06F 9/30047; G06F 9/3455; G06F 2212/1024; G06F 2212/6028
See application file for complete search history.

(56) References Cited

U.S. PATENT DOCUMENTS

2016/0188476 A1* 6/2016 Yu .......................... G06F 9/3455
                                                             711/137
2024/0161855 A1* 5/2024 Smith .................... G11C 29/42

FOREIGN PATENT DOCUMENTS

CN            118132464 A       6/2024

OTHER PUBLICATIONS

Fu G., et al., "Differential-Matching Prefetcher for Indirect Memory Access", 2024 IEEE International Symposium on High-performance Computer Architecture (HPCA), IEEE, Mar. 2, 2024, pp. 439-453, XP034578646, p. 440, left-hand column line 1—p. 445, right-hand column line 1.
International Search Report and Written Opinion—PCT/US2025/036846—ISA/EPO—Oct. 17, 2025.

* cited by examiner

*Primary Examiner* — Yong J Choe
(74) *Attorney, Agent, or Firm* — QUALCOMM Incorporated

(57) ABSTRACT

Certain aspects of the present disclosure provide techniques and apparatus that may be used to efficiently train address generation components of an indirect memory prefetcher (IMP). In some cases, logical shift operators and comparators may be used to determine an unknown size and base address used to generate a prefetch address.

20 Claims, 5 Drawing Sheets

100 ⟍

STEP 1: Compute Size, Using Logical Shifts and Comparators $\Delta B * Size = \Delta B * 2^{Exp}$ Exp(Size)

310

$\Delta B$ (No Shift)

$\Delta B << 1$ $\Delta B << 2$ $\Delta B << N$ $\Delta B >> 1$ $\Delta B >> 2$ $\Delta B >> N$

| 0 |
| 1 |
| 2 |
| : |
| N |
| -1 |
| -2 |
| : |
| -N |

Each Comparison Block Compares a shifted version of $\Delta B$ ($\Delta B * Size$) with $\Delta A$ Ouput of Comparators indicates the correct B * Size---> Use to calculate Base Address STEP 2: Compute Base Address Using Computed SizeLogical Shifts and Comparators

320

B (No Shift)

B << 1

B << 2

B << N

B >> 1

B >> 2

B >> N

B * Size

A baseAddress = A - B*Size

FIG. 3

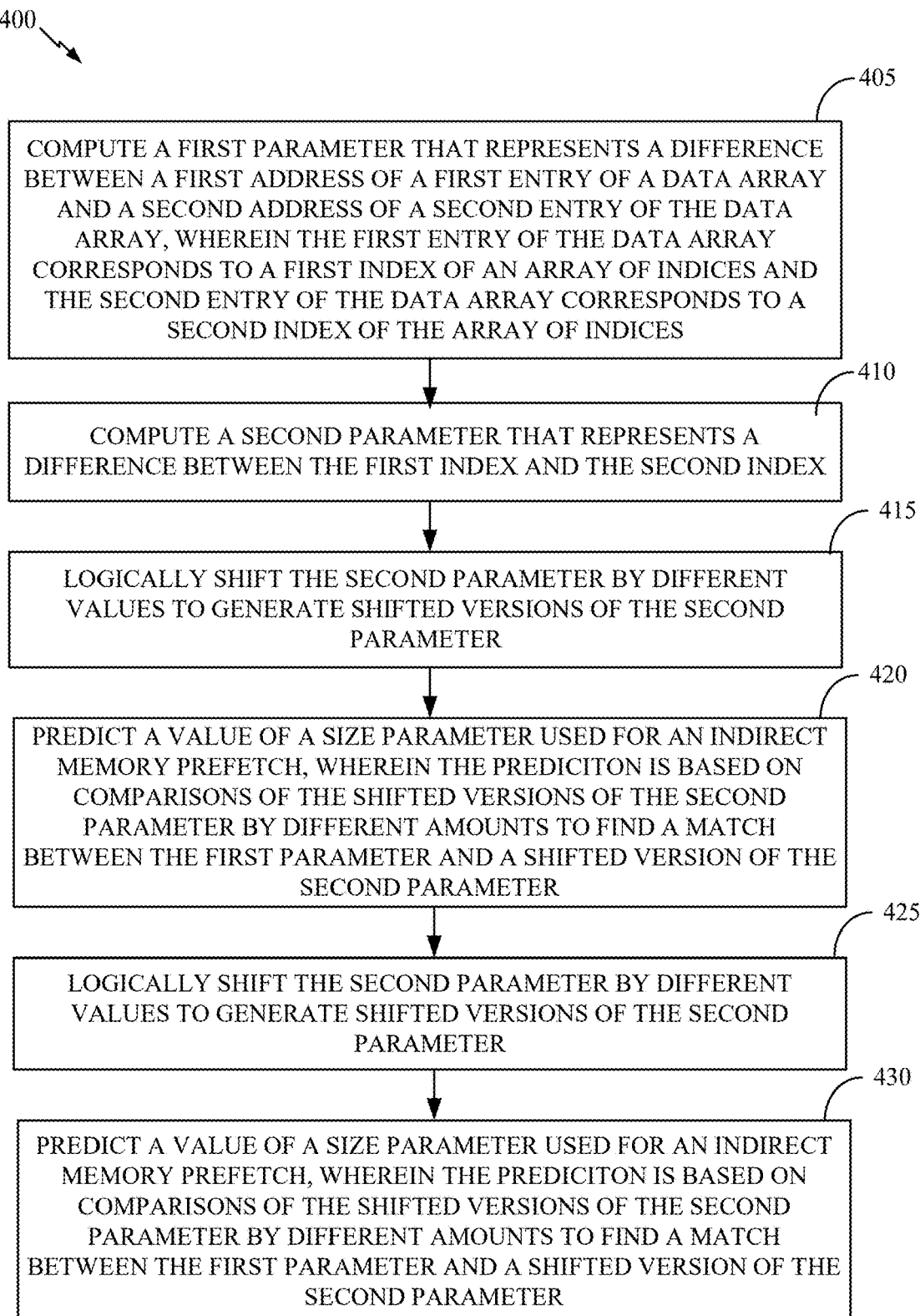

400

405

COMPUTE A FIRST PARAMETER THAT REPRESENTS A DIFFERENCE BETWEEN A FIRST ADDRESS OF A FIRST ENTRY OF A DATA ARRAY AND A SECOND ADDRESS OF A SECOND ENTRY OF THE DATA ARRAY, WHEREIN THE FIRST ENTRY OF THE DATA ARRAY CORRESPONDS TO A FIRST INDEX OF AN ARRAY OF INDICES AND THE SECOND ENTRY OF THE DATA ARRAY CORRESPONDS TO A SECOND INDEX OF THE ARRAY OF INDICES

410

COMPUTE A SECOND PARAMETER THAT REPRESENTS A DIFFERENCE BETWEEN THE FIRST INDEX AND THE SECOND INDEX

415

LOGICALLY SHIFT THE SECOND PARAMETER BY DIFFERENT VALUES TO GENERATE SHIFTED VERSIONS OF THE SECOND PARAMETER

420

PREDICT A VALUE OF A SIZE PARAMETER USED FOR AN INDIRECT MEMORY PREFETCH, WHEREIN THE PREDICITON IS BASED ON COMPARISONS OF THE SHIFTED VERSIONS OF THE SECOND PARAMETER BY DIFFERENT AMOUNTS TO FIND A MATCH BETWEEN THE FIRST PARAMETER AND A SHIFTED VERSION OF THE SECOND PARAMETER

425

LOGICALLY SHIFT THE SECOND PARAMETER BY DIFFERENT VALUES TO GENERATE SHIFTED VERSIONS OF THE SECOND PARAMETER

430

PREDICT A VALUE OF A SIZE PARAMETER USED FOR AN INDIRECT MEMORY PREFETCH, WHEREIN THE PREDICITON IS BASED ON COMPARISONS OF THE SHIFTED VERSIONS OF THE SECOND PARAMETER BY DIFFERENT AMOUNTS TO FIND A MATCH BETWEEN THE FIRST PARAMETER AND A SHIFTED VERSION OF THE SECOND PARAMETER

FIG. 4

DIFFERENTIAL APPROACH FOR INDIRECT MEMORY PREFETCHER TRAINING

TECHNICAL FIELD

Certain aspects of the present disclosure generally relate to prefetchers and, more particularly, to techniques for training indirect memory prefetcher (IMP) components.

BACKGROUND

A processing system includes a central processing unit (CPU), cache memory, main memory (e.g., random access memory), and a prefetcher. The prefetcher anticipates data (and/or instructions) the CPU may need from the main memory, fetches the data from the main memory, and loads the data into the cache memory. By fetching the data from the main memory before the data is needed by the CPU, the prefetcher minimizes an amount of time the CPU has to wait for data thereby improving the efficiency of the processing system.

BRIEF SUMMARY

Certain aspects provide a method that may be used to train indirect memory prefetcher (IMP) components. The memory generally includes computing a first parameter that represents a difference between a first address of a first entry of a data array and a second address of a second entry of the data array, wherein the first entry of the data array corresponds to a first index of an array of indices and the second entry of the data array corresponds to a second index of the array of indices, computing a second parameter that represents a difference between the first index and the second index, logically shifting the second parameter by different values to generate shifted versions of the second parameter, predicting a value of a size parameter used for an indirect memory prefetch, wherein the prediction is based on comparisons of the shifted versions of the second parameter by different amounts to find a match between the first parameter and a shifted version of the second parameter, computing a base address for the indirect memory prefetch based on the predicted value of the size parameter, the first parameter, and the second parameter, and computing an address for the indirect memory prefetch based on the computed base address and the predicted value of the size parameter.

Other aspects provide a processor comprising an IMP configured to perform the aforementioned method as well as those described herein; and a processor comprising means for performing the aforementioned method as well as those further described herein.

The following description and the related drawings set forth in detail certain illustrative features of one or more aspects.

BRIEF DESCRIPTION OF THE DRAWINGS

The appended figures depict certain features of one or more aspects of the present disclosure and are therefore not to be considered limiting of the scope of this disclosure.

FIG. 3 depicts an example differential approach to train an IMP memory address generation component, according to various aspects of the present disclosure.

FIG. 4 depicts a method for training an IMP address generation component, according to various aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Aspects of the present disclosure provide apparatuses, methods, processing systems, and computer-readable mediums for training an IMP address generation component.

Memory prefetching generally refers to a mechanism used in computer architectures to improve the efficiency of memory access by speculatively loading data into memory with low access times (e.g., a local cache). Prefetching works by predicting which data (or instructions) will be needed soon (e.g., next or in the near future) and loading that data into a cache (which is fast access) before it is actually requested by a processor (e.g., a central processing unit/CPU). This helps to reduce the latency associated with fetching data from main memory, which is slower than accessing data from the cache. By preloading data into the cache, prefetching can significantly speed up the execution of programs, especially those with predictable memory access patterns, such as loops or sequential data processing.

There are various types of prefetching techniques, including hardware prefetching and software prefetching. As the name implies, hardware prefetching is implemented in hardware and operates automatically, without requiring any software intervention. Hardware prefetching relies on algorithms to predict future memory accesses based on past patterns.

An indirect memory prefetcher (IMP) generally refers to a type of hardware prefetcher designed to work with relatively complex tasks with less predictable access patterns. These patterns might occur in data structures like linked lists, trees, or hash tables, where the next memory address is determined by the content of the current memory location (e.g., following a pointer). An indirect prefetcher analyzes the memory access patterns and the data dependencies to predict which addresses will be accessed next, even if the sequence is not linear or regular.

Disclosed techniques may be used to efficiently train components that perform IMP memory access. As will be discussed in more detail with reference to FIGS. 2 and 3, a differential approach proposed herein may help reduce hardware components which may result in both dynamic and static power savings.

Example Computing Environment for Prefetching

Figure 1:
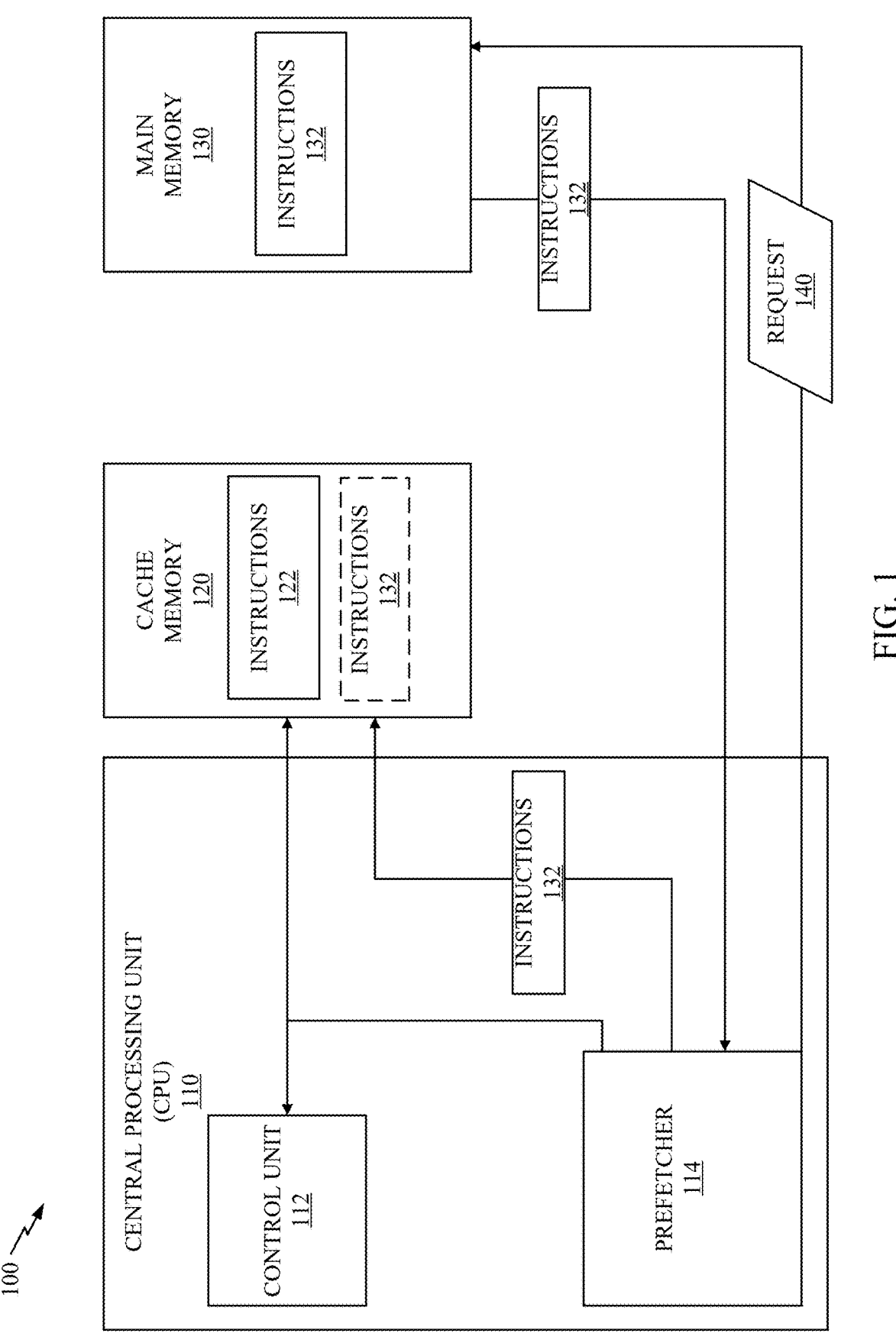
FIG. 1 depicts an example computing environment for prefetching an access pattern associated with an application according to various aspects of the present disclosure.

FIG. 1 illustrates an example computing environment 100 for prefetching according to various aspects of the present disclosure. The computing environment 100 includes a central processing unit (CPU) 110 configured to execute instructions to perform various computing operations. The CPU 110 may include a control unit 112 and a prefetcher 114.

The computing environment 100 includes a cache memory 120 communicatively coupled to the CPU 110. The cache memory 120 may store instructions 122 to be executed by the CPU 110. Although the cache memory 120 is depicted as being separate from the CPU 110, the cache memory 120 may, in some aspects, be included as part of the CPU 110.

The computing environment 100 includes a main memory 130. The main memory 130 is slower than the cache memory 120 and is configured to store instructions 132 to be executed by the CPU 110. In certain aspects, the main memory 130 may include random access memory (RAM).

The prefetcher 114 of the CPU 110 is configured to anticipate data and/or instructions, such as the instructions 132 stored in the main memory 130, that are needed by the CPU 110, such as the control unit 112 thereof, and are not already loaded into the cache memory 120. The prefetcher 114 may be further configured to fetch the instructions 132 from the main memory 130 and load the instructions 132 into the cache memory 120 before the instructions 132 are needed by the CPU 110.

As an example, a prefetch operation performed by the prefetcher 114 may include the prefetcher 114 requesting the instructions 132 from the main memory 130 (e.g., by sending a request 140). The prefetcher operation may include receiving the instructions 132 from the main memory 130 and loading the instructions 132 into the cache memory 120. By fetching the instructions 132 from the main memory 130 and loading the instructions 132 into the cache memory 120 before the instructions 132 are needed by the CPU 110, the prefetcher 114 minimizes an amount of time the CPU 110 has to wait for the instructions 132 thereby improving the performance (e.g., efficiency) of the CPU 110.

In certain aspects, the instructions 132 stored on the main memory 130 may include multiple instructions stored at different memory addresses of the main memory 130. For example, a first instruction for the control unit 112 may be stored at a first memory address of the main memory 130, and a second instruction for the control unit 112 may be stored at a second memory address of the main memory 130. In such aspects, the prefetcher 114 may be configured to perform separate prefetch operations for the first instruction and the second instruction.

As an example, a first prefetch operation performed by the prefetcher 114 may include sending a request to read the data (e.g., first instruction) stored at the first memory address to obtain the first instruction. In this manner, the prefetcher 114 may obtain the first instruction to load into the cache memory 120. Furthermore, a second prefetch operation performed by the prefetcher 114 may include sending a request to read the data (e.g., second instruction) stored at the second memory address to obtain the second instruction. In this manner, the prefetcher 114 may obtain the second instruction to load into the cache memory 120.

Example Indirect Memory Prefetcher

As noted above, an indirect memory prefetcher (IMP) generally refers to a type of hardware prefetcher designed to work with relatively complex tasks with less predictable access patterns. These patterns might occur in data structures like linked lists, trees, or hash tables, where the next memory address is determined by the content of the current memory location (e.g., following a pointer). An indirect prefetcher analyzes the memory access patterns and the data dependencies to predict which addresses will be accessed next, even if the sequence is not linear or regular.

An indirect memory prefetcher differs from a direct memory prefetcher in the way it predicts future memory accesses.

Direct prefetchers typically predict future memory addresses based on regular patterns or strides observed in the sequence of memory accesses. For example, if a program accesses memory addresses in a linear sequence (e.g., 1000, 1004, 1008), a direct prefetcher might analyze this sequence to deduce the stride size is 4. Based on this information, the direct prefetcher may predict that the next address will be 1012 and prefetch that data.

Indirect prefetchers, on the other hand, are typically designed to handle more complex and less predictable access patterns. These patterns might occur in data structures like linked lists, trees, or hash tables, where the next memory address is determined by the content of the current memory location (e.g., following a pointer). An indirect prefetcher analyzes the memory access patterns and the data dependencies to predict which addresses will be accessed next, even if the sequence is not linear or regular.

In this manner, indirect prefetchers identify complex access patterns that are dependent on the data rather than the sequence of accesses. Indirect prefetchers may use machine learning or heuristic-based techniques to adapt to the access patterns of the running program. Indirect prefetchers may be particularly useful for pointer-chasing workloads, where each memory access depends on the result of the previous one, such as in linked data structures.

By prefetching data more accurately for irregular access patterns, indirect prefetchers can significantly reduce cache misses and memory latency. By helping to keep the cache populated with useful data, indirect prefetchers may help improve overall cache utilization and efficiency.

Differential Approach for Indirect Memory Prefetcher Training

One potential challenge with indirect memory prefetchers (IMPs) is that the design for an effective indirect prefetcher is typically more complex than for a direct prefetcher due to the need for advanced prediction algorithms. Further, additional logic to train for pattern recognition and prediction can introduce some overhead in terms of hardware resources and power consumption.

Disclosed techniques may be used to efficiently train components that perform IMP memory access. As will be discussed in more detail with reference to FIGS. 2 and 3, a differential approach proposed herein may help reduce hardware components which may result in both dynamic and static power savings.

Figure 2:
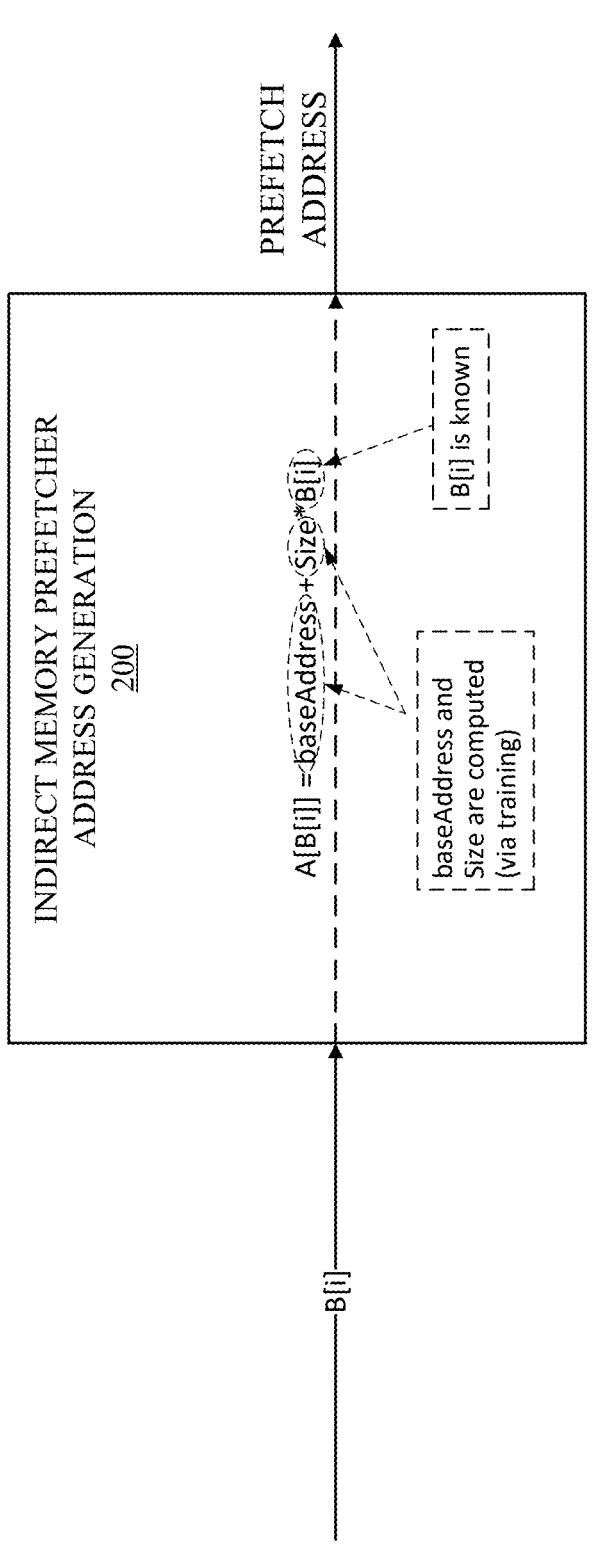
FIG. 2 depicts an address generation component of an indirect memory prefetcher (IMP), according to various aspects of the present disclosure.

A high percentage of codes operating on sparse datasets may rely on indirect memory accesses in the form of A[B[i]], where the index of the outer array is the value stored in a memory location within the inner array B[i]. B[i] values (indexes) are typically pre-computed and stored consecutively. In such cases, as illustrated in FIG. 2, an address generation component 200 of an IMP tries to identify memory accesses (prefetch addresses) in the form of:

$$A[B[i]] = \text{baseAddress} + \text{Size} * B[i], \qquad \text{Eq.1}$$

where Size is the size of each element in A and baseAddress is A[0]. Size and baseAddress are typically both constant for a specific indirect pattern. If an IMP has access to B[i] early, it may predict Size and baseAddress. These values may then be used to compute an address of A[B[i]] before the software accesses it.

Since the values for Size and baseAddress, for a given indirect pattern, are typically computed through a training system over several cycles by solving a two-variable equation system. Because training is done over several cycles, reducing the hardware components, using the mechanism proposed herein, will result in both dynamic and static power saving.

Aspects of present disclosure provide hardware configurations configured to efficiently compute values for Size and baseAddress taking advantage of basic assumptions in the relationship between elements in A[i] and B[i].

The techniques proposed herein may be understood by observing the relationship, in mathematical terms, between different elements j and k sharing a constant baseAddress such that:

$$baseAddress[j]==baseAddress[k]. \qquad \text{Eq. 2}$$

To compute the value of baseAddress, two consequent steps may performed. In a first step (Step 1), division may be performed to determine the size, where:

$$Size=(addressOf(A[B[j]])-addressOf(A[B[k]]))/(B[j]- \\ B[k]). \qquad \text{Eq. 3}$$

In a second step (Step 2), a multiplication unit may check to see what value of Size is going to produce the same baseAddress for both j, k:

$$baseAddress[j]=addressOf(A[B[j]])-B[j]*Size; \text{ and} \qquad \text{Eq. 4}$$

$$baseAddress[k]=addressOf(A[B[k]])-B[k]*Size \qquad \text{Eq. 5}$$

Because such division and multiplication operations are typically performed over multiple cycles, providing a more efficient hardware structure may significantly reduce power consumption by reducing switching activity and area.

A mechanism proposed herein takes a differential approach, utilizing a parameter that may be referred to as a differential index, ΔB, calculated as difference between elements in B[i], and a differential address, ΔAddr, defined as a difference between corresponding elements in A[i]. ΔB and ΔAddr may be defined as:

$$\Delta Addr=addressOf(A[B[j]])-addressOf(A[B[k]]); \text{ and} \qquad \text{Eq. 6}$$

$$\Delta B=B[j]-B[k]. \qquad \text{Eq. 7}$$

To provide an efficient hardware design for computing the values of Size and baseAddress (e.g., during training), aspects of the present disclosure take advantage the following observations.

First, in the case that the value of Size is an exponent of 2 (e.g., $2^N$), then division and multiplication are reduced to shifters (e.g., where each shift left multiplies the original value by 2, each shift right divides the original value by 2).

Second, for the same Size, sharing a common base address (baseAddress[j]==baseAddress[k]) implies that:

$$(baseAddress[j]-baseAddress[k])==0, \qquad \text{Eq. 8}$$

should always hold. Thus, it can be demonstrated that ΔB==ΔAddr, as follows. Subtracting Eq. 5 from Eq. 4 yields:

$$baseAddress[j]-baseAddress[k]=(addressOf(A[B[j]])- \\ addressOf(A[B[k]]))-(B[j]-B[k])*Size; \qquad \text{Eq.9}$$

since baseAddress[j]−baseAddress[k]=0, ΔAddr=addressOf(A[B[j]])−addressOf(A[B[k]]), and B[j]−B[k]=ΔB, Eq. 9 can be simplified as:

$$0=\Delta Addr-\Delta B*Size; \text{ or} \qquad \text{Eq. 10}$$

$$\Delta Addr=\Delta B*Size. \qquad \text{Eq. 11}$$

FIG. 3 illustrates an example configuration of hardware components that may take advantage of the observations noted above to efficiently compute values for Size and baseAddress in a two-step process.

Using the first observation noted above, Size may be defined as $2^N$. As a result, a size value prediction may be performed by an arrangement 310 of comparators. As illustrated, each comparison block is configured to compare a different shifted version of ΔB (each corresponding to ΔB*Size).

In other words, the comparison block for exponent N=0 corresponds to an un-shifted version of ΔB (Size=1), the comparison block for exponent N=1 corresponds to a version of ΔB shifted to the left by 1 (Size=2), the comparison block for exponent N=2 corresponds to a version of ΔB shifted to the left by 2 (Size=4), and so on. Similarly, the comparison block for exponent N=−1 corresponds to a version of ΔB shifted to the right by 1 (Size=1/2), the comparison block for exponent N=−2 corresponds to a version of ΔB shifted to the right by 4 (Size=1/4), and so on.

Thus, the output of the comparison block effectively indicates the correct value of Size (and ΔB*Size) that results in a common base address. This output can then be used in a second step to compute this common base address as:

$$baseAddress=A-B*Size. \qquad \text{Eq. 12}$$

As illustrated, the output of the comparison from arrangement 310 (that corresponded to a value of Size that resulted in a match in the first step) may be used to control a multiplexor 320 to output the corresponding value of ΔB*Size.

With values for Size and baseAddress efficiently computed (e.g., during training), the IMP may use these values to generate prefetch addresses when performing indirect memory accesses.

In general, the number of different sizes evaluated (values for exponent N) will determine the hardware complexity of the configuration shown in FIG. 3. Those skilled in the art will appreciate that different configurations may similarly take advantage of the observations above to efficiently determine values for Size and baseAddress. For example, a variation would be to have different shifted values of ΔB fed into a multiplexor and the exponent N of Size ($2^N$) may be used to select the multiplexor output. The selected output may be compared with ΔAddr.

Regardless of the particular implementation, efficiently computing the values for Size and baseAddress by taking advantage of relationship between elements in A[i] and B[i] may help reduce hardware components and result in both dynamic and static power saving.

Example Method for Training an Indirect Memory Prefetching

FIG. 4 is a diagram depicting an example method 400 for prefetching with a pointer prefetcher, according to various aspects of the present disclosure. For example, method 400 may be performed by the pointer prefetcher/address generation component 200 of an IMP of FIG. 2 and/or by a processing system such as processing system 500 of FIG. 5, described below.

Method 400 begins at block 405, with computing a first parameter that represents a difference between a first address of a first entry of a data array and a second address of a second entry of the data array, wherein the first entry of the data array corresponds to a first index of an array of indices and the second entry of the data array corresponds to a second index of the array of indices.

Method 400 continues at block 410, with computing a second parameter that represents a difference between the first index and the second index.

Method 400 continues at block 415, with logically shifting the second parameter by different values to generate shifted versions of the second parameter.

Method 400 continues at block 420, with predicting a value of a size parameter used for an indirect memory prefetch, wherein the prediction is based on comparisons of the shifted versions of the second parameter by different amounts to find a match between the first parameter and a shifted version of the second parameter.

Method 400 continues at block 425, with computing a base address for the indirect memory prefetch based on the predicted value of the size parameter, the first parameter, and the second parameter.

Method 400 continues at block 430, with computing an address for the indirect memory prefetch based on the computed base address and the predicted value of the size parameter.

Example Processing System

Figure 5:
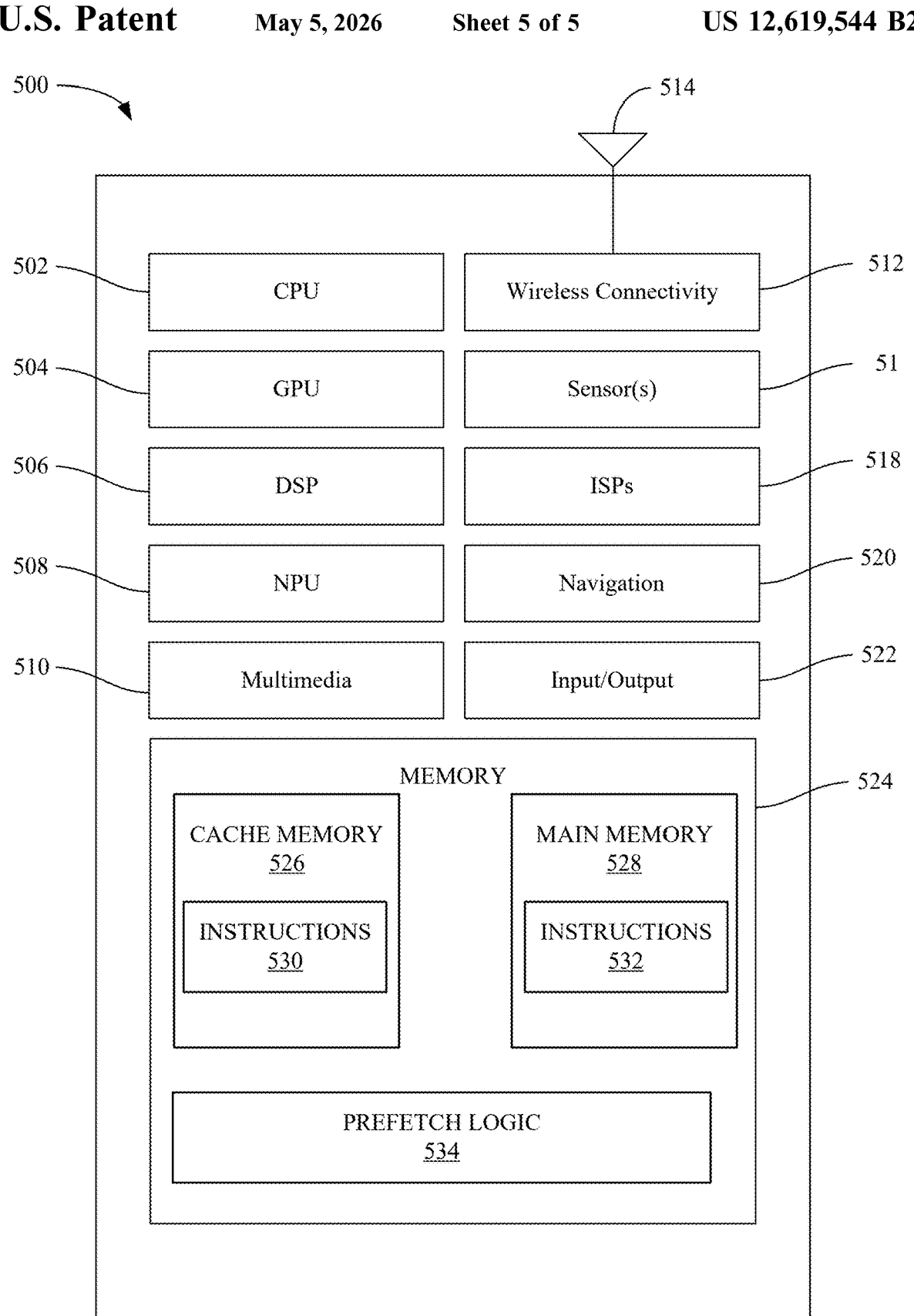
FIG. 5 depicts an example processing system configured to perform various aspects of the present disclosure.

In some aspects, the techniques and methods described with reference to FIGS. 2-4 may be implemented on one or more devices or systems. FIG. 5 depicts an example processing system 500 configured to perform various aspects of the present disclosure, including, for example, the techniques and methods described with respect to FIGS. 2-4. In some aspects, the processing system 500 may correspond to the computing environment 100 of FIG. 1. Although depicted as a single system for conceptual clarity, in some aspects, as discussed above, the operations described below with respect to the processing system 500 may be distributed across any number of devices or systems.

The processing system 500 includes a central processing unit (CPU) 502 (e.g., corresponding to CPU 110 of FIG. 1). Instructions executed at the CPU 502 may be loaded, for example, from a cache memory (e.g., corresponding to the cache memory 120 of FIG. 1) associated with the CPU 502.

The processing system 500 also includes additional processing components tailored to specific functions, such as a graphics processing unit (GPU) 504, a digital signal processor (DSP) 506, a neural processing unit (NPU) 508, a multimedia component 510 (e.g., a multimedia processing unit), and a wireless connectivity component 512.

An NPU, such as NPU 508, is generally a specialized circuit configured for implementing the control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing unit (TPU), neural network processor (NNP), intelligence processing unit (IPU), vision processing unit (VPU), or graph processing unit.

NPUs, such as the NPU 508, are configured to accelerate the performance of common machine learning tasks, such as image classification, machine translation, object detection, and various other predictive models. In some examples, a plurality of NPUs may be instantiated on a single chip, such as a SoC, while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece of data through an already trained model to generate a model output (e.g., an inference).

In some implementations, the NPU 508 is a part of one or more of the CPU 502, the GPU 504, and/or the DSP 506.

In some examples, the wireless connectivity component 512 may include subcomponents, for example, for third generation (3G) connectivity, fourth generation (4G) connectivity (e.g., 4G Long-Term Evolution (LTE)), fifth generation connectivity (e.g., 5G or New Radio (NR)), Wi-Fi connectivity, Bluetooth connectivity, and/or other wireless data transmission standards. The wireless connectivity component 512 is further coupled to one or more antennas 514.

The processing system 500 may also include one or more sensor processing units 516 associated with any manner of sensor, one or more image signal processors (ISPs) 518 associated with any manner of image sensor, and/or a navigation processor 520, which may include satellite-based positioning system components (e.g., GPS or GLONASS), as well as inertial positioning system components.

The processing system 500 may also include one or more input and/or output devices 522, such as screens, touch-sensitive surfaces (including touch-sensitive displays), physical buttons, speakers, microphones, and the like.

In some examples, one or more of the processors of the processing system 500 may be based on an ARM or RISC-V instruction set.

The processing system 500 also includes the memory 524, which is representative of one or more static and/or dynamic memories, such as a dynamic random access memory, a flash-based static memory, and the like. In this example, the memory 524 includes computer-executable components, which may be executed by one or more of the aforementioned processors of the processing system 500.

The memory 524 may include cache memory 526 (e.g., corresponding to the cache memory 120 illustrated in FIG. 1). The memory 524 may also include main memory 528 (e.g., corresponding to the main memory 130 illustrated in FIG. 1). The cache memory 526 may include instructions 530 to be executed by the CPU 502. The main memory 528 also includes instructions 532 to be executed by the CPU 502. As discussed previously, a prefetcher (e.g, the prefetcher 114 illustrated in FIG. 1) may anticipate that the CPU 502 needs instructions 532 from the main memory 528 and fetch the instructions 532 from the main memory 528 and load the instructions 532 into the cache memory 526 before the instructions 532 are requested by the CPU 502.

Generally, the processing system 500 and/or components thereof may be configured to perform the methods described herein. For example, the memory 524 may include sub-cacheline filtering logic 534, such as the sub-cacheline filtering logic 220 of FIG. 2, needed to perform the disclosed techniques, such as the method of FIG. 4, to improve the timeliness and/or accuracy of prefetches performed by a pointer prefetcher.

Notably, in other aspects, elements of the processing system 500 may be omitted, such as where the processing system 500 is a server computer or the like. For example, the multimedia component 510, the wireless connectivity component 512, the sensor processing units 516, the ISPs 518, and/or the navigation processor 520 may be omitted in other aspects. Further, aspects of the processing system 500 may be distributed between multiple devices.

Example Clauses

Implementation examples are described in the following numbered clauses:

Clause 1: A method for computing an address for an indirect memory prefetch address, comprising: computing a first parameter that represents a difference between a first address of a first entry of a data array and a second address of a second entry of the data array, wherein the first entry of the data array corresponds to a first index of an array of indices and the second entry of the data array corresponds to a second index of the array of indices; computing a second parameter that represents a difference between the first index and the second index; logically shifting the second parameter by different values to generate shifted versions of the second parameter; predicting a value of a size parameter used for an indirect memory prefetch, wherein the prediction is based on comparisons of the shifted versions of the second parameter by different amounts to find a match between the first parameter and a shifted version of the second parameter; computing a base address for the indirect memory prefetch based on the predicted value of the size parameter, the first parameter, and the second parameter; and computing an address for the indirect memory prefetch based on the computed base address and the predicted value of the size parameter.

Clause 2: The method of Clause 1, wherein the size parameter corresponds to a size of elements in the data array.

Clause 3: The method of any one of Clauses 1-2, wherein each of the different values correspond to a different value of the size parameter equal to 2 to an exponent of n.

Clause 4: The method of Clause 3, wherein the different values include at least one value corresponding to n=0.

Clause 5: The method of Clause 3, wherein the different values include at least one value corresponding to a value of the size parameter that is less than 1.

Clause 6: The method of Clause 3, further comprising using a result of the comparisons to control a multiplexor to select a corresponding shifted version of the second parameter for use in computing the base address.

Clause 7: An apparatus, comprising: at least one memory comprising executable instructions; and at least one processor configured to execute the executable instructions and cause the apparatus to perform a method in accordance with any combination of Clauses 1-6.

Clause 8: An apparatus, comprising means for performing a method in accordance with any combination of Clauses 1-6.

Clause 9: A non-transitory computer-readable medium comprising executable instructions that, when executed by at least one processor of an apparatus, cause the apparatus to perform a method in accordance with any combination of Clauses 1-6.

Clause 10: A computer program product embodied on a computer-readable storage medium comprising code for performing a method in accordance with any combination of Clauses 1-6.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

For example, means for obtaining a triggering access comprising a line trigger virtual address denoting a beginning of a payload of a cache line may include a pointer prefetcher (e.g., pointer prefetcher/address generation component 200 of an IMP as illustrated in FIG. 2). Means for determining a stride associated with the producer workload based, at least in part, on a virtual address of the producer workload may include the pointer prefetcher. Means for determining a sub-cacheline trigger virtual address of the triggering access based, at least in part, on the line trigger virtual address of the triggering access, the virtual address of the producer workload, and the stride associated with the producer workload may include the pointer prefetcher. Means for launching, starting at the sub-cacheline trigger virtual address of the triggering access, prefetches for data offsets within the cache line and pointed to by the stride associated with the producer workload may include the pointer prefetcher.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for computing an address for an indirect memory prefetch address, comprising:
   circuitry configured to compute a first parameter that represents a difference between a first address of a first entry of a data array and a second address of a second entry of the data array, wherein the first entry of the data array corresponds to a first index of an array of indices and the second entry of the data array corresponds to a second index of the array of indices;
   circuitry configured to compute a second parameter that represents a difference between the first index and the second index;
   circuitry configured to logically shift the second parameter by different values to generate shifted versions of the second parameter;
   circuitry configured to predict a value of a size parameter used for an indirect memory prefetch, wherein the prediction is based on comparisons of the shifted versions of the second parameter by different amounts to find a match between the first parameter and a shifted version of the second parameter;
   circuitry configured to compute a base address for the indirect memory prefetch based on the predicted value of the size parameter, the first parameter, and the second parameter; and
   circuitry configured to compute a prefetch address for the indirect memory prefetch based on the computed base address and the predicted value of the size parameter.

2. The apparatus of claim 1, wherein the size parameter corresponds to a size of elements in the data array.

3. The apparatus of claim 1, wherein each of the different values correspond to a different value of the size parameter equal to 2 to an exponent of an integer, n.

4. The apparatus of claim 3, wherein the different values include at least one value corresponding to n=0.

5. The apparatus of claim 3, wherein the different values include at least one value corresponding to a value of the size parameter that is less than 1.

6. The apparatus of claim 3, wherein the circuitry configured to compute the base address uses a result of the comparisons to control a multiplexor to select a corresponding shifted version of the second parameter for use in computing the base address.

7. The apparatus of claim 1, further computing circuitry for performing the indirect memory prefetch based on the computed prefetch address.

8. A method for computing an address for an indirect memory prefetch address, comprising:
   computing a first parameter that represents a difference between a first address of a first entry of a data array and a second address of a second entry of the data array, wherein the first entry of the data array corresponds to a first index of an array of indices and the second entry of the data array corresponds to a second index of the array of indices;
   computing a second parameter that represents a difference between the first index and the second index;
   logically shifting the second parameter by different values to generate shifted versions of the second parameter;
   predicting a value of a size parameter used for an indirect memory prefetch, wherein the prediction is based on comparisons of the shifted versions of the second parameter by different amounts to find a match between the first parameter and a shifted version of the second parameter;
   computing a base address for the indirect memory prefetch based on the predicted value of the size parameter, the first parameter, and the second parameter; and
   computing an address for the indirect memory prefetch based on the computed base address and the predicted value of the size parameter.

9. The method of claim 8, wherein the size parameter corresponds to a size of elements in the data array.

10. The method of claim 8, wherein each of the different values correspond to a different value of the size parameter equal to 2 to an exponent of an integer, n.

11. The method of claim 10, wherein the different values include at least one value corresponding to n=0.

12. The method of claim 10, wherein the different values include at least one value corresponding to a value of the size parameter that is less than 1.

13. The method of claim 10, further comprising using a result of the comparisons to control a multiplexor to select a corresponding shifted version of the second parameter for use in computing the base address.

14. The method of claim 8, further computing performing the indirect memory prefetch based on the computed address.

15. An apparatus, comprising:
   means for computing a first parameter that represents a difference between a first address of a first entry of a data array and a second address of a second entry of the data array, wherein the first entry of the data array corresponds to a first index of an array of indices and the second entry of the data array corresponds to a second index of the array of indices;

means for computing a second parameter that represents a difference between the first index and the second index;

means for logically shifting the second parameter by different values to generate shifted versions of the second parameter;

means for predicting a value of a size parameter used for an indirect memory prefetch, wherein the prediction is based on comparisons of the shifted versions of the second parameter by different amounts to find a match between the first parameter and a shifted version of the second parameter;

means for computing a base address for the indirect memory prefetch based on the predicted value of the size parameter, the first parameter, and the second parameter; and means for computing an address for the indirect memory prefetch based on the computed base address and the predicted value of the size parameter.

16. The apparatus of claim 15, wherein the size parameter corresponds to a size of elements in the data array.

17. The apparatus of claim 15, wherein each of the different values correspond to a different value of the size parameter equal to 2 to an exponent of an integer, n.

18. The apparatus of claim 17, wherein the different values include at least one value corresponding to n=0.

19. The apparatus of claim 17, wherein the different values include at least one value corresponding to a value of the size parameter that is less than 1.

20. The apparatus of claim 17, further comprising means for using a result of the comparisons to control a multiplexor to select a corresponding shifted version of the second parameter for use in computing the base address.

* * * * *